(12) United States Patent
Martens et al.

(10) Patent No.: US 7,055,329 B2
(45) Date of Patent: Jun. 6, 2006

(54) METHOD AND APPARATUS FOR NOISE ATTENUATION FOR GAS TURBINE ENGINES USING AT LEAST ONE SYNTHETIC JET ACTUATOR FOR INJECTING AIR

(75) Inventors: Steven Martens, West Chester, OH (US); Seyed Gholamali Saddoughi, Clifton Park, NY (US); Kevin Sean Early, Oregonia, OH (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 10/403,331

(22) Filed: Mar. 31, 2003

(65) Prior Publication Data

US 2004/0187474 A1 Sep. 30, 2004

(51) Int. Cl.
*F02C 1/00* (2006.01)

(52) U.S. Cl. .................... 60/772; 60/226.1; 60/262; 60/770; 239/265.17; 181/220

(58) Field of Classification Search ............. 60/226.1, 60/262, 263, 770, 226.3, 264; 239/265.17, 239/265.29, 265.31; 181/213, 220
See application file for complete search history.

(56) References Cited

U.S. PATENT DOCUMENTS

| | | | | | |
|---|---|---|---|---|---|
| 3,162,265 | A | * | 12/1964 | Hay | 181/215 |
| 4,043,121 | A | * | 8/1977 | Thomas et al. | 60/204 |
| 4,080,785 | A | * | 3/1978 | Koff et al. | 60/226.3 |
| 4,215,536 | A | * | 8/1980 | Rudolph | 60/262 |
| 4,294,068 | A | * | 10/1981 | Klees | 60/204 |
| 4,375,276 | A | * | 3/1983 | Konarski | 239/265.29 |
| 4,435,958 | A | * | 3/1984 | Klees | 60/204 |
| 4,462,207 | A | * | 7/1984 | Hitchcock | 60/204 |
| 4,805,401 | A | * | 2/1989 | Thayer et al. | 60/226.2 |
| 4,934,481 | A | * | 6/1990 | Friedrich | 181/215 |
| 5,184,459 | A | * | 2/1993 | McAndrews | 60/226.3 |
| 5,222,359 | A | * | 6/1993 | Klees et al. | 60/204 |
| 5,261,227 | A | * | 11/1993 | Giffin, III | 60/226.1 |

(Continued)

*Primary Examiner*—William H. Rodriguez
(74) *Attorney, Agent, or Firm*—ArmstrongTeasdale LLP; William Scott Andes

(57) ABSTRACT

A method enables a gas turbine engine to be operated. The method comprises channeling exhaust gases from a core engine through an exhaust assembly and past at least one flow boundary surface, and selectively operating a noise suppression system extending from the at least one flow boundary surface to facilitate attenuating noise generated during engine operation.

17 Claims, 3 Drawing Sheets

U.S. PATENT DOCUMENTS

| | | | |
|---|---|---|---|
| 5,291,672 A * | 3/1994 | Brown | 60/262 |
| 5,364,029 A * | 11/1994 | Barcza | 239/127.3 |
| 5,577,381 A * | 11/1996 | Eigenbrode et al. | 60/226.1 |
| 5,655,360 A * | 8/1997 | Butler | 60/226.2 |
| 5,722,231 A * | 3/1998 | Porte | 60/226.2 |
| 5,758,823 A * | 6/1998 | Glezer et al. | 239/4 |
| 5,771,681 A * | 6/1998 | Rudolph | 60/262 |
| 5,778,659 A * | 7/1998 | Duesler et al. | 60/226.1 |
| 5,779,150 A * | 7/1998 | Lidstone et al. | 239/265.13 |
| 5,884,843 A * | 3/1999 | Lidstone et al. | 239/265.13 |
| 5,894,990 A * | 4/1999 | Glezer et al. | 239/423 |
| 5,941,065 A * | 8/1999 | Lidstone et al. | 60/771 |
| 5,957,413 A * | 9/1999 | Glezer et al. | 244/208 |
| 5,988,522 A * | 11/1999 | Glezer et al. | 239/11 |
| 6,056,204 A * | 5/2000 | Glezer et al. | 239/8 |
| 6,070,407 A * | 6/2000 | Newton | 60/226.1 |
| 6,123,145 A * | 9/2000 | Glezer et al. | 165/104.33 |
| 6,135,043 A * | 10/2000 | Bandyopadhyay | 114/67 R |
| 6,151,885 A * | 11/2000 | Metezeau et al. | 60/226.2 |
| 6,170,253 B1 * | 1/2001 | Newton | 60/226.2 |
| 6,308,898 B1 * | 10/2001 | Dorris et al. | 239/265.17 |
| 6,311,928 B1 * | 11/2001 | Presz et al. | 244/110 B |
| 6,314,721 B1 * | 11/2001 | Mathews et al. | 60/264 |
| 6,318,070 B1 * | 11/2001 | Rey et al. | 60/226.3 |
| 6,360,528 B1 | 3/2002 | Brausch et al. | |
| 6,457,654 B1 * | 10/2002 | Glezer et al. | 239/4 |
| 6,487,848 B1 * | 12/2002 | Zysman et al. | 60/262 |
| 6,502,383 B1 | 1/2003 | Janardan et al. | |
| 6,568,172 B1 * | 5/2003 | Jannetta et al. | 60/226.2 |
| 6,588,497 B1 * | 7/2003 | Glezer et al. | 165/84 |
| 6,658,839 B1 * | 12/2003 | Hebert | 60/204 |
| 6,718,752 B1 * | 4/2004 | Nesbitt et al. | 60/204 |
| 6,735,936 B1 * | 5/2004 | Rey et al. | 60/226.3 |
| 6,751,944 B1 * | 6/2004 | Lair | 60/226.3 |
| 6,759,159 B1 * | 7/2004 | Gray et al. | 429/71 |
| 2002/0121090 A1 * | 9/2002 | Zysman et al. | 60/770 |
| 2002/0125340 A1 * | 9/2002 | Birch et al. | 239/265.11 |
| 2002/0190165 A1 | 12/2002 | Glezer et al. | |
| 2002/0195526 A1 | 12/2002 | Barrett et al. | |
| 2003/0075615 A1 | 4/2003 | Saddoughi | |
| 2003/0177899 A1 * | 9/2003 | Monson et al. | 92/98 R |
| 2004/0031258 A1 * | 2/2004 | Papamoschou | 60/204 |
| 2004/0088967 A1 * | 5/2004 | Webster et al. | 60/204 |

* cited by examiner methods and apparatus for noise attenuation for gas turbine engines using at least one synthetic jet actuator for injecting air

BACKGROUND OF THE INVENTION

This invention relates generally to gas turbine engines, more particularly to methods and apparatus for operating gas turbine engines.

At least some known gas turbine engines include a core engine having, in serial flow arrangement, a fan assembly and a high pressure compressor which compress airflow entering the engine, a combustor which burns a mixture of fuel and air, and low and high pressure rotary assemblies which each include a plurality of rotor blades that extract rotational energy from airflow exiting the combustor.

Combustion gases are discharged from the core engine through an exhaust assembly. More specifically, within known turbofan engines, a core exhaust nozzle is used to discharge core exhaust gases radially inwardly from a concentric fan exhaust nozzle which exhausts fan discharge air therefrom for producing thrust. Typically, both exhaust flows have a maximum velocity when the engine is operated during high power operations, such as during take-off operation of an aircraft. During such operations, the high velocity flows interact with each other, well as ambient air flowing past the engine, and may produce substantial noise along the take-off path of the aircraft.

To facilitate jet noise reduction, at least some known turbine engines include a plurality of chevron nozzles positioned within the exhaust assembly to facilitate enhancing mixing between the core and bypass exhaust flows. Although such devices do provide a noise reduction benefit during take-off conditions, because the chevron nozzles are mechanical devices which remain positioned in the flow path at all flight conditions, such devices may adversely impact engine performance during all engine operating conditions. Specifically, during cruise conditions, chevron nozzles may adversely impact specific fuel consumption (SFC) of the engine.

BRIEF DESCRIPTION OF THE INVENTION

In one aspect, a method for operating a gas turbine engine is provided. The method comprises channeling exhaust gases from a core engine through an exhaust assembly and past at least one flow boundary surface, and selectively operating a noise suppression system extending from the at least one flow boundary surface to facilitate attenuating noise generated during engine operation.

In another aspect, an exhaust assembly for a gas turbine engine is provided. The exhaust assembly includes a flow boundary surface for channeling exhaust from the engine, an outlet for discharging exhaust from the engine, and a noise suppression system. The noise suppression system extends from at least one of the flow boundary surface and the outlet. The noise suppression system is selectively operable during engine operations to facilitate attenuating jet noise generated during engine operation.

In a further aspect, a gas turbine engine is provided. The engine includes a core engine and an exhaust assembly. The exhaust assembly extends downstream from the core engine for discharging exhaust gases from the core engine. The exhaust assembly includes a flow boundary surface and a noise suppression system that extends from the flow boundary surface. The noise suppression system is selectively operable to facilitate attenuating noise generated during engine operation.

DETAILED DESCRIPTION OF THE INVENTION

Figure 1:
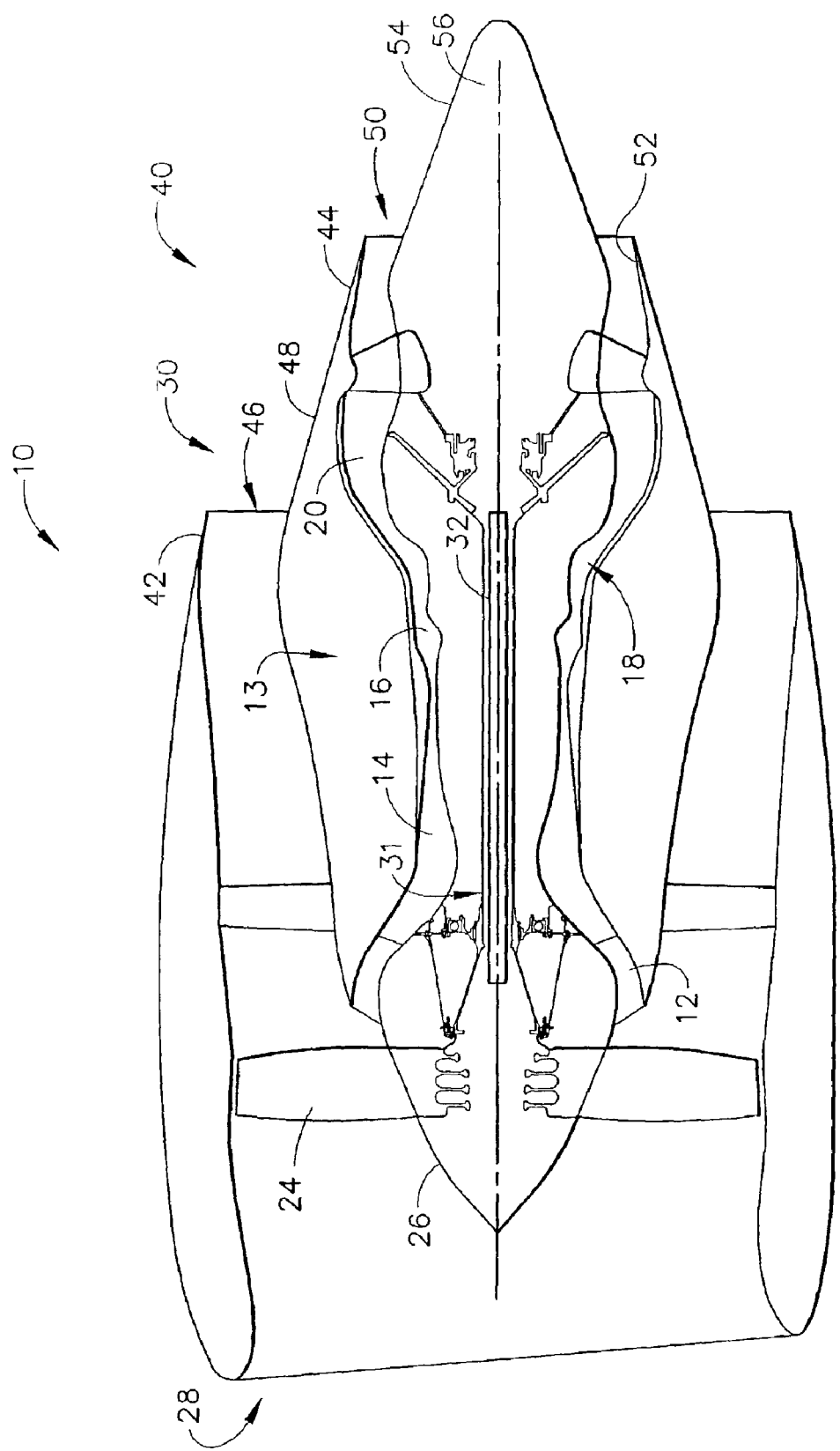
FIG. 1 is a schematic of a gas turbine engine.

FIG. 1 is a schematic illustration of a gas turbine engine 10 including a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

An exhaust assembly 40 extends downstream from core engine 31 and includes an annular fan exhaust nozzle 42 that extends around, and is spaced radially outwardly from, a core engine exhaust nozzle 44. More specifically, fan exhaust nozzle 42 is positioned upstream from core exhaust nozzle 44 and is spaced radially outwardly from core exhaust nozzle 44 such that an annular bypass stream outlet 46 is defined between fan exhaust nozzle 42 and engine cowling 48 extending circumferentially around core engine 13.

Core exhaust nozzle 44 also has an annular outlet 50 defined between an inner surface 52 of cowling 48 and an outer surface 54 of a centerbody or center plug 56. In an alternative embodiment, core exhaust nozzle 44 is known as a long-ducted mixed flow exhaust and is discharged into stream outlet 46 upstream from centerbody 56, such that core combustion gases are mixed with bypass stream flow prior to the mixture being discharged from exhaust assembly 40. In the exemplary embodiment, centerbody 56 extends aftward from core engine 13 such that core exhaust nozzle outlet 50 is upstream from an aft end 58 of centerbody 56. In an alternative embodiment, centerbody 56 does not extend downstream from nozzle outlet 50, and rather nozzle outlet 50 is downstream from centerbody 56.

During operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31. More specifically, to produce thrust from engine 10, fan discharge flow is discharged through fan exhaust nozzle 42, and core combustion gases are discharged from engine 10 through core engine exhaust nozzle 44. In one embodiment, engine 10 is operated at a relatively high bypass ratio which is indicative of the amount of fan air which bypasses core engine 13 and is discharged through fan exhaust nozzle 42. In an alternative embodiment, gas turbine engine 10 is operable with a low bypass ratio.

Figure 2:
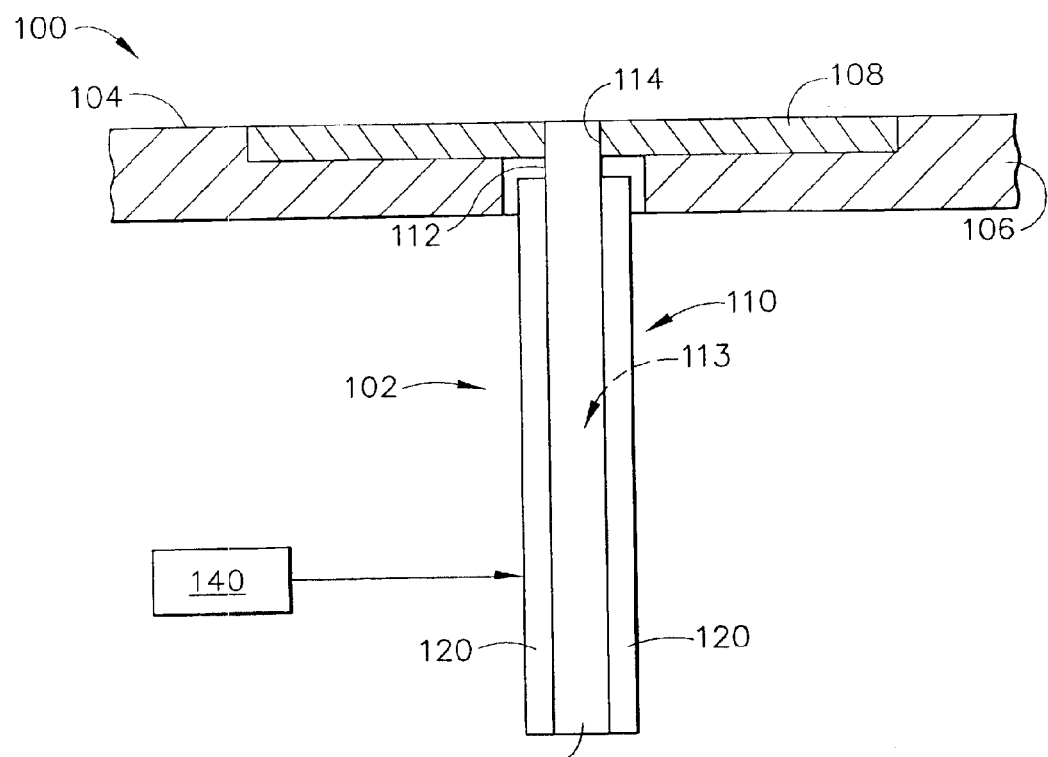
FIG. 2 is a cross-sectional schematic view of a portion of an exemplary noise suppression system that may be used with the engine shown in FIG. 1.
Figure 3:
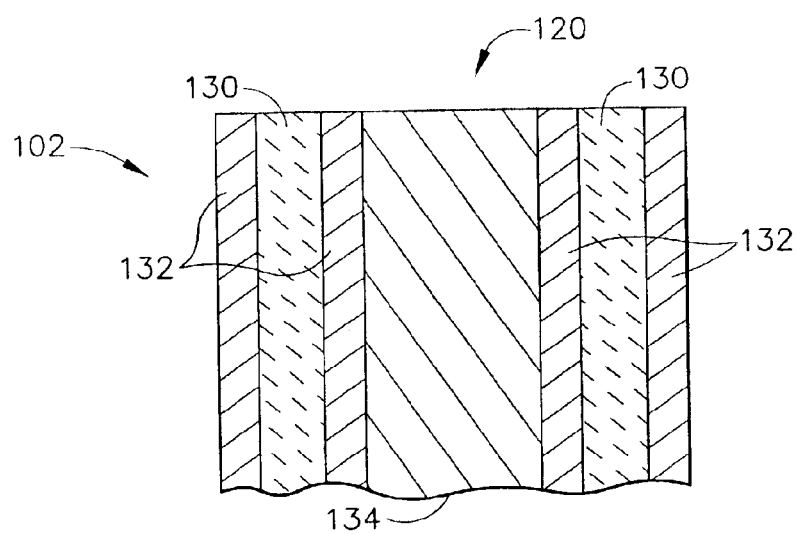
FIG. 3 is an enlarged schematic view of the noise suppression system shown in FIG. 2 and taken along area 3.
Figure 4:
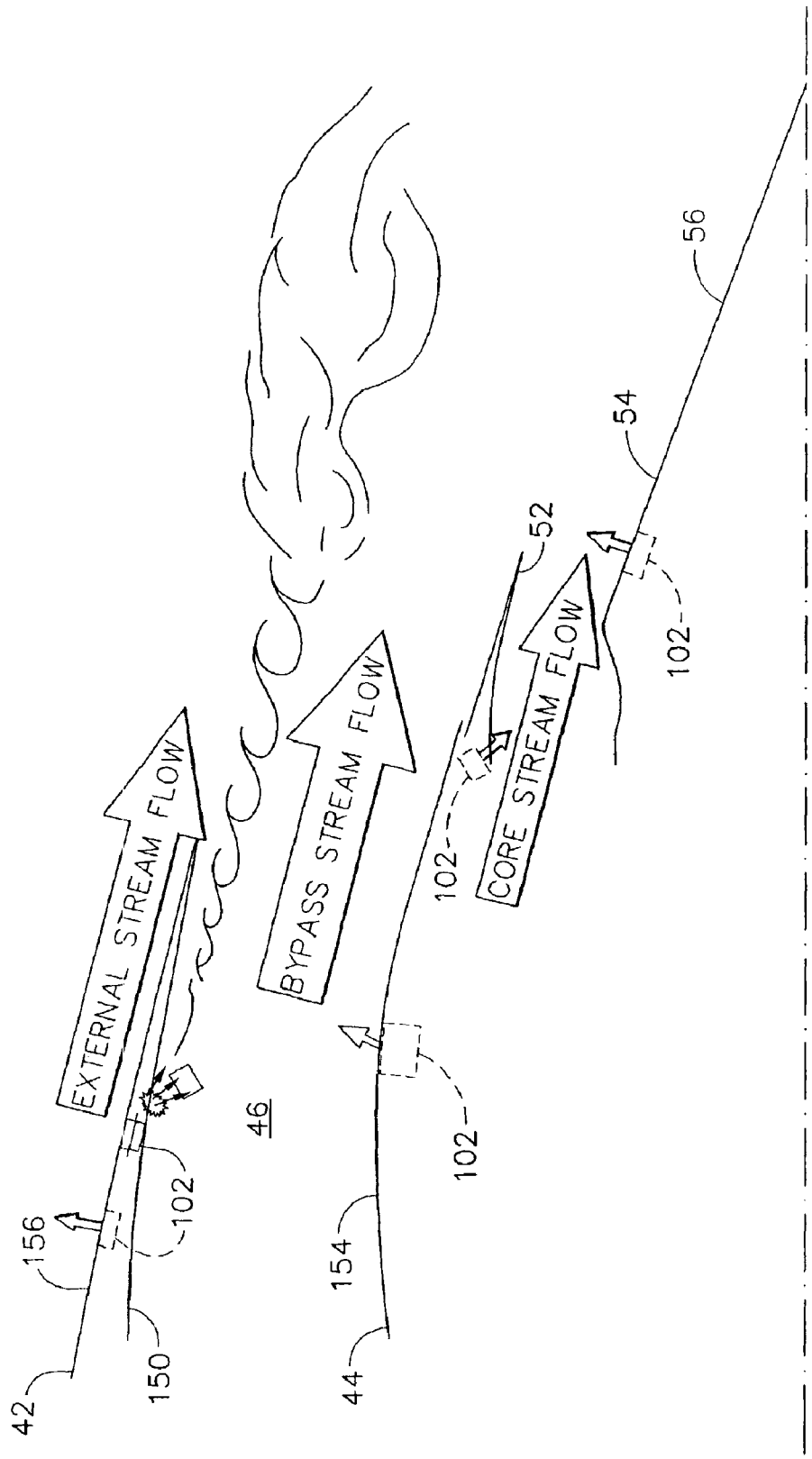
FIG. 4 is a schematic illustration illustrating exemplary mounting configurations of the noise suppression system shown in FIG. 2 within the engine shown in FIG. 1.

FIG. 2 is a cross-sectional schematic view of a portion of an exemplary noise suppression system 100 that may be used with engine 10. FIG. 3 is an enlarged schematic view of noise suppression system 100 taken along area 3. FIG. 4 is a schematic illustration illustrating exemplary mounting configurations of noise suppression system 100 within engine 10. In the exemplary embodiment, noise suppression system 100 includes at least one synthetic jet actuator 102 that extends from a flow boundary surface 104. More specifically, actuator 102 is positioned within a wall 106 such that actuator 102 is radially inwardly from an orifice plate 108, such that orifice plate 108 forms at least a portion of flow boundary surface 104. A vortex generator body 110 is coupled to orifice plate 108 by a discharge conduit 112, which is an extension of a flexible hinge 116, as described in more detail below.

Vortex generator body 110 includes a central cavity 113 that is coupled in flow communication with flow boundary surface 104 through an a plurality of orifices 114 formed through plate 108. In the exemplary embodiment, plate 108 includes a series of orifices 114. In another embodiment, plate 108 includes an elongated slot rather than a series of openings. It should be noted that the size, shape, number and angular orientation of orifices 114 with respect to flow boundary surface 104 is variably selectable to suit a particular application. For example, orifices 114 may be angularly oriented in a downstream direction (pitch angle), or orifices 114 may be angularly oriented in the plane of orifice plate 108 (yaw angle).

In the exemplary embodiment, orifices 114 on orifice plate are arranged with a central opening and a plurality of side openings disposed on either side of the central opening. Furthermore, each orifice 114 has a conical or nozzle-like profile, so that an inlet to each orifice 114 is larger in diameter than an outlet of each respective orifice 114. In another embodiment, each orifice 114 has a converging-diverging profile. To facilitate channeling airflow, some orifices are oriented in an opposite flow direction than other orifices, which facilitates increasing a velocity of airflow out of vortex cavity 113, which in turn facilitates increasing the overall effectiveness of each synthetic jet actuator 102.

In the exemplary embodiment, vortex generator body 110 is fabricated from a pair of side plates 120 that are coupled together by hinge 116. Plates 120 are spaced apart from each other and in the exemplary embodiment, are substantially parallel. Hinge 116 encircles the space defined between the plates and may overlap a portion of plates 120, such that hinge 116 holds plates 120 together while defining a portion of cavity 113. Hinge 116 is constructed from any flexible, fluid-tight material. In one embodiment, hinge 116 is fabricated from a material that is suitable as an adhesive, such as, but not limited to a room temperature vulcanizing (RTV) material.

Side plates 120 are formed from a pluarality of generally planar stacked layers 130. More specifically, each side plate 120 forms a bimorph piezoelectric structure including two piezoelectric layers 130 having opposite polarities. In the exemplary embodiment, jet actuator 102 includes two plates 120, and is known as a dual bimorph synthetic jet (DBSJ). In one embodiment, piezoelectric layers 130 are fabricated from a piezoceramic material. Because of the opposite-facing polarities, when a voltage is applied to actuator jet 102, one layer 130 expands while the other layer 130 contracts.

In the exemplary embodiment, plates 120 are substantially circular and since the piezoelectric layers 130 are parallel to each other, applying a voltage causes at least one plate 120 to bow and become substantially hemispherically-shaped. More specifically, when a voltage of opposite polarity is applied, side plate 120 bends in the opposite direction (i.e. becomes concave rather than convex). This arrangement in effect doubles the force exerted for a given voltage compared to a single piezoelectric layer. In the exemplary embodiment, piezoelectric layers 130 are covered on each side with a thin protective cladding layer 132 to prevent cracking of layers 130 during operation. In one embodiment, cladding layer 132 is fabricated from stainless steel and is attached to layers 130 with a suitable adhesive.

Piezoelectric layers 130 are coupled to opposite sides of a central layer referred to as a shim 134, for example, with an adhesive. The material and thickness of shim 134 is variably selected to provide a desired sufficient stiffness to body 110 such that body 110 is operable in a predetermined frequency range. For example, in one embodiment, shim 134 is fabricated from aluminum and is about 0.51 mm (0.020 in.) thick.

Plates 120 are connected together by hinge 116 and are also coupled to a controllable electric source 140. Source 140 provides an alternating voltage of a predetermined magnitude and frequency to plates 120. During operation, voltage from electric source 140 is applied to the side plates 120 so as to cause plates 120 to deflect in opposite directions relative to each other. In the exemplary embodiment, the actuation of plates 120 and jet actuator 102 is pulsed rather than continuous. In another embodiment, jet actuator 102 is operated continuously. More specifically, when one plate 120 is deflected convexly outward, the other opposite plate 120 will be deflected convexly outward in an opposite direction. The simultaneous deflection of plates 120 and causes a decreased partial pressure within fluid cavity 113, which in turn causes fluid to enter cavity 113 through a respective orifice 114.

When voltage of opposite polarity is applied, plates 120 deflect in the opposite direction. This simultaneous deflection reduces the volume of fluid cavity 113 and causes fluid to be expelled through discharge conduit 112 and outwardly from a respective orifice 114. For example, in one embodiment, actuator 102 produces a jet velocity of approximately 85.4 m/s (280 ftls) from discharge conduit 112 when a 750 Hz, 150V RMS input signal is applied.

In an alternative embodiment, vortex generator body 110 includes a plurality of discharge conduits 112 arranged around a periphery of vortex generator body 110. More specifically, the number of discharge conduits 112 is only limited by the physical space available. Although the outlet discharge velocity is reduced by adding additional discharge conduits 112, the outlet velocity is not reduced in proportion to the number of additional discharge conduits 112.

Noise suppression system 100 includes a plurality of circumferentially-spaced synthetic jet actuators 102 mounted in exhaust assembly 40. In the exemplary embodiment, actuators 102 are spaced circumferentially around bypass stream outlet 46, and as described in more detail below, expel air into bypass stream outlet 46. More specifically, in the exemplary embodiment, actuators 102 are spaced along an inner surface 150 of fan exhaust nozzle 42. Alternatively, actuators 102 may be mounted along surface 150 and/or an outer surface 154 of cowling 48. In another embodiment, shown in hidden in FIG. 4, actuators 102 are spaced circumferentially around core exhaust nozzle outlet 50 and may be mounted along cowling inner surface 52 and/or along centerbody surface 54, and expel air into core exhaust nozzle outlet 50. In a further embodiment, also shown hidden in FIG. 4, actuators 102 are spaced circumferentially along an outer surface 156 of fan exhaust nozzle 42 and expel air into an external air stream flowing past engine 10.

Specifically, jet actuators 102 expel air at a sufficient magnitude and orientation with respect to the flow they are penetrating as to generate streamwise vortices. More specifically, in the exemplary embodiment, synthetic jet actuators 102 are selectably operable to expel air into bypass stream outlet 46. Air expelled from actuators 102 facilitates enhanced mixing of fan discharge flow with core exhaust flow exiting core exhaust nozzle 44 and with surrounding ambient air flow. The enhanced mixing decreases the velocity gradients within the exhaust flow and as such, facilitates attenuating jet noise generated during engine operation. However, because actuators 102 are selectably operable and do not remain in the stream flow during all engine operations, actuators 102 do not generate aerodynamic performance losses during flight regimes wherein noise reduction is not required.

The above-described noise suppression system provides a cost-effective and reliable means for attenuating jet noise during selected flight regimes. More specifically, the noise suppression system includes at least one synthetic jet actuator that is mounted within the exhaust assembly of the engine. The actuator is selectably operable during only selected flight regimes to expel air into the exhaust flow to facilitate generating vortices within the flow downstream from the actuator. The vortices enhance mixing of the exhaust flows and facilitate decreasing the velocity of the exhaust flow. As a result, the noise suppression system facilitates attenuating jet noise in a cost effective and reliable manner.

Exemplary embodiments of noise suppression systems and exhaust assemblies are described above in detail. The exhaust assemblies are not limited to the specific embodiments described herein, but rather, components of each assembly may be utilized independently and separately from other components described herein. For example, each noise suppression component can also be used in combination with other exhaust assemblies.

While the invention has been described in terms of various specific embodiments, those skilled in the art will recognize that the invention can be practiced with modification within the spirit and scope of the claims.

What is claimed is:

1. A method for operating a gas turbine engine, said method comprising:
   channeling exhaust gases from a core engine through an exhaust assembly and past at least one flow boundary surface; and
   selectively operating a noise suppression system extending from the at least one flow boundary surface to facilitate attenuating noise generated during engine operation by injecting air into a stream flow from the at least one flow boundary surface to form streamwise vortices.

2. A method in accordance with claim 1 wherein channeling exhaust gases from a core engine further comprises:
   channeling a flow through a core stream passageway defined between a core cowl and an engine centerbody; and
   injecting air from said noise suppression system inwardly into the core stream passageway.

3. A method in accordance with claim 1 wherein channeling exhaust gases from a core engine further comprises:
   channeling a flow through a bypass stream passageway defined between an annular core nozzle and an annular fan nozzle; and
   injecting air from said noise suppression system inwardly into the bypass stream passageway.

4. A method in accordance with claim 1 wherein channeling exhaust gases from a core engine further comprises injecting air from said noise suppression system inwardly into the external stream flow flowing past the gas turbine engine.

5. An assembly for a gas turbine engine, said assembly comprising:
   a centerbody;
   a fan nozzle assembly having an outer case;
   a fan nozzle radially outwardly from said centerbody, at least one of said fan nozzle and said centerbody comprises a flow boundary; and
   a noise suppression system extending from at least one of said fan assembly outer case and said centerbody, said noise suppression system selectively operable during engine operations to facilitate attenuating jet noise generated during engine operation and configured to inject air from at least one flow boundary surface and generate streamwise vortices into at least one of a bypass stream flow and a freestream flowing past said assembly.

6. An assembly in accordance with claim 5 wherein said noise suppression system comprises at least one synthetic jet actuator.

7. An assembly in accordance with claim 5 wherein said flow boundary comprises a radially outer surface of at least one of said centerbody and said fan nozzle.

8. An assembly in accordance with claim 5 further comprising an annular core nozzle spaced radially outwardly from said centerbody, said flow boundary comprises a radially inner surface of said core nozzle, said noise suppression system is configured to inject air into a core stream passageway defined between said annular core nozzle and the centerbody.

9. An exhaust assembly in accordance with claim 5 wherein said flow boundary comprises a radially inner surface of said fan nozzle, said noise suppression system is configured to inject air into a bypass stream passageway defined between said fan nozzle and the annular core nozzle.

10. An assembly in accordance with claim 5 wherein said annular fan nozzle is spaced radially outwardly from an annular core nozzle, said flow boundary comprises a radially outer surface of said fan nozzle, said noise suppression system is configured to inject air into the external stream flow surrounding said fan nozzle.

11. A gas turbine engine comprising:
   a core engine; and
   an exhaust assembly extending downstream from said core engine for discharging exhaust gases from said core engine, said exhaust assembly comprising a flow boundary surface and a noise suppression system extending from said flow boundary surface, said noise suppression system is selectively operable to facilitate attenuating noise generated during engine operation by injecting air outwardly from said at least one flow boundary surface to generate streamwise vortices.

12. A gas turbine engine in accordance with claim 11 wherein said exhaust assembly noise suppression system comprises at least one synthetic jet actuator.

13. A gas turbine engine in accordance with claim 11 wherein said exhaust assembly further comprises a centerbody extending aftward from said core engine, said noise suppression system extending from a radially outer surface of said centerbody for injecting air into exhaust gases flowing past said centerbody.

14. A gas turbine engine in accordance with claim 11 wherein said exhaust assembly further comprises a centerbody and an annular core nozzle, said core nozzle spaced radially outwardly from said centerbody such that a core stream passageway is defined therebetween, said noise suppression system for injecting air inwardly into said core stream passageway.

15. A gas turbine engine in accordance with claim 11 wherein said exhaust assembly further comprises a centerbody, an annular core nozzle, and a fan nozzle, said core nozzle spaced radially outwardly from said centerbody such that a core stream passageway is defined therebetween, said fan nozzle spaced radially outwardly from said core nozzle such that a bypass stream passageway is defined therebetween, said noise suppression system for injecting air inwardly into said bypass stream passageway.

16. A gas turbine engine in accordance with claim 11 wherein said exhaust assembly further comprises a centerbody, an annular core nozzle, and a fan nozzle, said core nozzle spaced radially outwardly from said centerbody such that a core stream passageway is defined therebetween, said fan nozzle spaced radially outwardly from said core nozzle such that a bypass stream passageway is defined therebetween, said noise suppression system for injecting air radially outwardly from said fan nozzle into an external stream flow surrounding said fan nozzle.

17. A gas turbine engine in accordance with claim 11 wherein said gas turbine engine comprises at least one of a high bypass ratio turbofan engine and a low bypass ratio turbofan engine.

\* \* \* \* \*